No. 737,511. PATENTED AUG. 25, 1903.
J. T. SMITH.
APPARATUS FOR SPREADING AND THINNING FLAX OR HEMP STRAW.
APPLICATION FILED JAN. 2, 1902.
NO MODEL.
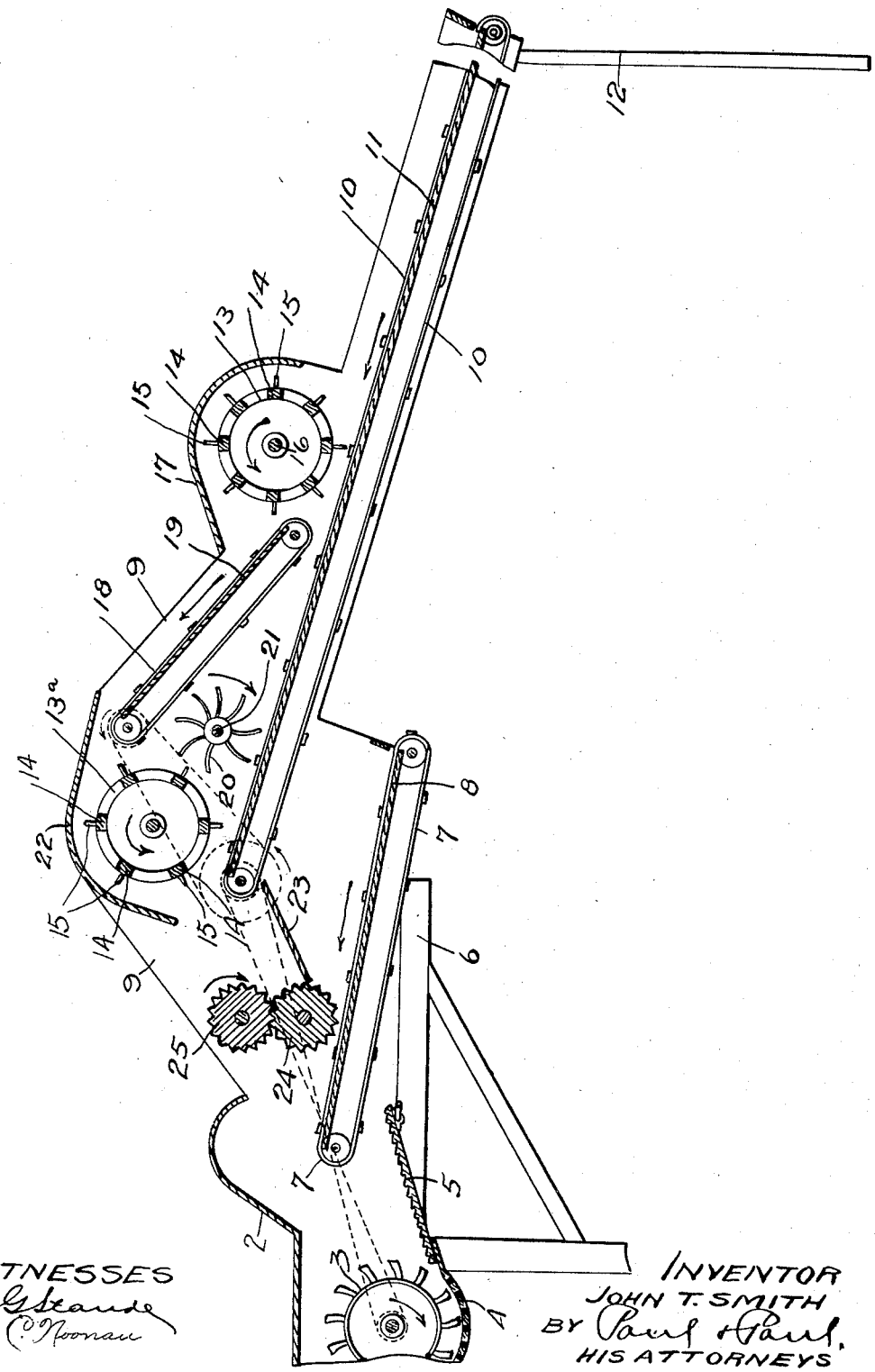
WITNESSES
E. Straud
M. C. Noonan
INVENTOR
JOHN T. SMITH
BY Paul & Paul,
HIS ATTORNEYS No. 737,511. Patented August 25, 1903.

UNITED STATES PATENT OFFICE.

JOHN T. SMITH, OF HERON LAKE, MINNESOTA.

APPARATUS FOR SPREADING AND THINNING FLAX OR HEMP STRAW.

SPECIFICATION forming part of Letters Patent No. 737,511, dated August 25, 1903.

Application filed January 2, 1902. Serial No. 88,016. (No model.)

*To all whom it may concern:*

Be it known that I, JOHN T. SMITH, of Heron Lake, Jackson county, Minnesota, have invented certain new and useful Improvements in Apparatus for Spreading and Thinning Flax or Hemp Straw, of which the following is a specification.

My invention relates to machines for treating flax and hemp straw; and the object of the invention is to provide an apparatus that is capable of being attached to a band-cutter and feeder of the ordinary construction for the purpose of spreading and thinning the straw before it enters the feeder, to the end that the material will be fed in a thin continuous stream to the threshing-cylinder and a more perfect separation of the seeds and straw and refuse material obtained.

A further object is to provide an apparatus to which the straw to be spread or thinned can be delivered directly from the load.

Other objects of the invention will appear from the following detailed description.

The invention consists generally in various constructions and combinations, all as hereinafter described, and particularly pointed out in the claims.

In the drawing the figure represents a longitudinal section of a straw-treating apparatus embodying my invention.

In the drawing, 2 represents the casing of a band-cutter and feeder; 3, the threshing-cylinder; 4, the concave, and 5 the oscillating feed-pan.

6 is the supporting-frame for the casing; 7, the usual carrier-belt operating over a floor 8.

9 represents the casing of the straw-treating apparatus within which the spreading and thinning mechanism is arranged.

10 is a long slatted carrier-belt operating over an inclined floor 11. This belt and floor extends for a considerable distance out from the band-cutter casing and is supported at its outer end upon suitable legs 12. I prefer to make this carrier of sufficient length, so that loads of flax or hemp straw can be drawn up beside the carrier and the straw pitched directly thereon from the load, there being sufficient room upon each side of the carrier for several loads at one time.

At a suitable distance from the inner end of the carrier 10 I provide a picker-wheel or cylinder 13, having a series of bars 14, wherein picker fingers or pins 15 are secured. This picker-wheel is mounted on a suitable shaft 16 in the casing 9, beneath the arched portion 17 thereof, and the lower side of said wheel passes close to the slatted carrier 10 and is adapted to pick up the straw thereon and carry it up beneath the arch 17 and after thoroughly shaking it to throw it upon an inclined carrier 18, that operates over a floor 19. The carrier 18 travels at about twice the speed of the carrier 10, and consequently the stream of straw passing over the carrier 18 will be considerably thinner than the stream that is brought up by the carrier 10. The lower end of the carrier 18 is a sufficient distance above the floor 11 to permit the chaff, loose seeds, and short straw to be carried along by the carrier 10 toward the threshing-cylinder. The upper end of the carrier 18 is a considerable distance above the floor 11, and between them I arrange a picker-wheel 20 upon a shaft 21. This wheel revolves at about the same speed as that of the carrier 10 and moving in the direction of the arrow tends to retard the chaff and short straw that are brought up by the carrier. Near the discharge end of the carrier 18 I provide a second picker-wheel 13$^a$, operating beneath an arch 22 of the casing and adapted to receive the straw from the carrier 18 and thoroughly shake up and spread the same. This last-named picker-wheel is near the picker 20 and receives the short straw and material therefrom and whirls it up under the arch 22 and finally throws it with the straw from the carrier 18 upon an inclined feed-board 23. This feed-board is located beneath the discharge end of the carrier 10 and receives the chaff and loose seed therefrom and any short straw that is not caught up by the picker 13$^a$. Near the discharge end of the feed-board I provide a pair of corrugated crushing-rolls 24 and 25, driven at a suitable speed and adapted to receive the straw from said feed-board and the picker-wheel 13$^a$. These rolls have preferably coarse corrugations and besides crushing some of the seed-bolls will also break up some of the woody portions of the fiber and in this way effect a preliminary crushing and breaking thereof. After leaving the crushing-rolls the straw falls upon the feeder-carrier and is moved onto the crushing-cylinder.

In the operation of this apparatus loose or unbound straw is pitched on the long conveyer 10 and carried thereby toward the cylinder. As the straw passes beneath the first picker 13 it is caught up thereby and shaken and separated and thrown upon the rapidly-moving carrier and from thence is delivered to the second revolving picker. These mechanisms spread and thin the straw, so that by the time it reaches the crushing-rolls and threshing-cylinder the bunches or forkfuls thrown on the long carrier will all be thinned and spread out, so that the straw will enter the rolls in a thin continuous stream. Heretofore it has been necessary to exercise some degree of care in feeding the straw to the threshing-cylinder on account of the danger of clogging the cylinder or of improperly threshing the grain. With this apparatus, however, it is not necessary to use care in feeding, as the spreading and thinning mechanism will put the straw in proper shape for the threshing-cylinder regardless of how it is thrown upon the carrier. Considerable time has thus been saved which heretofore has been necessary to expend in shaking up and separating the straw and loosening the bunches before allowing it to enter the feeder.

I claim as my invention—

1. The combination, with a threshing-cylinder, of crushing-rolls located near said cylinder, a long carrier having its discharge end above and near said rolls and whereon the straw to be separated and thinned is thrown from the load, a comparatively short carrier located above and operating obliquely with respect to said first-named carrier and at a higher speed, the receiving end of said short carrier being near said long carrier but a sufficient distance therefrom to allow the chaff and short straw to pass between them and a picker arranged above said long carrier and near the receiving end of said short carrier, substantially as described.

2. The combination, with a long carrier whereon the straw to be thinned and separated is thrown, of a comparatively short carrier located above the same and operating at an inclination thereto and at a higher speed, means for gathering up the long straw upon said long carrier and throwing it upon said short carrier, a picker provided near the discharge end of said short carrier and a retarding device arranged between said carriers.

3. The combination, with a long carrier whereon the straw to be thinned and separated is thrown, of a comparatively short carrier located above the same and operating at an incline thereto and at a higher speed, means for gathering up the long straw upon said long carrier and throwing it upon said short carrier, a picker provided near the discharge end of said short carrier, crushing-rolls whereto the material is delivered from said picker, and a threshing-cylinder provided near said rolls.

4. The combination, with a threshing-cylinder and its carrier, of a long carrier having its discharge end above the said first-named carrier, a revolving picker operating above said second carrier and adapted to gather up the straw thereon, a third carrier having its receiving end near said picker and operating at a higher speed than the said second carrier, whereby the straw delivered by said picker will be thinned and spread, and a second picker provided near the discharge end of said third carrier and above the discharge end of said second carrier, substantially as described.

5. The combination, with a threshing-cylinder and its carrier, of a long carrier operating above said first-named carrier and whereon the straw to be thinned is thrown, a picker-wheel operating above and near said second carrier and adapted to gather up the long straw brought up by the same, and a third carrier arranged to receive the long straw from said picker and operating at a higher speed than said long carrier and at an inclination with respect thereto.

6. The combination, with a threshing-cylinder and its carrier, of a long carrier located above said cylinder-carrier, and whereon the grain is pitched or thrown from the load, a third carrier operating at a higher speed than said second-named carrier and having its receiving end a sufficient distance above said second carrier to allow the short straw and chaff to pass between, a picker-wheel provided beneath the upper end of said third carrier and adapted to retard the short straw and chaff on said second carrier, and a picker-wheel near the discharge end of said third carrier to receive the straw therefrom, substantially as described.

7. The combination, with a threshing-cylinder and its carrier, of crushing-rolls located above said carrier, a second carrier whereon the grain to be treated is pitched or thrown, a third carrier having its lower end near said second carrier but a sufficient distance therefrom to allow the short straw and chaff to pass between, said third carrier operating at a higher speed than said second carrier, whereby the straw will be spread and thinned in passing over the same, and a picker provided near the discharge end of said third carrier and adapted to toss up and separate the straw and finally deliver it to said rolls in a thin continuous stream, substantially as described.

8. The combination, with a threshing-cylinder, of crushing-rolls provided near the same, a feed-board, a long slatted carrier whereon the straw to be spread and thinned is thrown, an upwardly-inclined carrier having its receiving end near said first-named carrier to receive the straw therefrom and operating at higher speed than said first-named carrier to cause a thinning or spreading of the stream of straw, the lower end of said upwardly-inclined carrier being a sufficient distance above said first-named carrier to allow the short straw and chaff to pass between them, and a picker to receive the material from said upwardly-inclined carrier and from said retarding device and deliver it to said feed-board and said rolls.

9. The combination, with the crushing-rolls and feed-board, of a floor provided near said feed-board, a slatted carrier operating over said floor and whereon the material to be thinned is thrown, a picker revolving above said carrier and adapted to toss up and separate the straw thereon, an upwardly-inclined floor near said picker, a slatted carrier operating over the same at a higher speed than said first-named carrier, whereby the straw will be thinned in passing over the same, the lower end of said second carrier being a sufficient distance above said first-named carrier to allow the short straw and chaff to pass between them, a retarding device provided between said carriers, and a second picker near the discharge end of said carriers and adapted to receive the long straw from one and the short straw from the other and deliver the material in a thin stream to said feed-board and said rolls.

10. The combination, with a long slatted carrier, of a shorter carrier arranged above the same and operating at an angle thereto and at a higher speed, the receiving end of said shorter carrier being near said long carrier but a sufficient distance therefrom to allow the chaff and short straws to pass between, a picker near the discharge end of said short carrier to receive the material therefrom, and a retarding device provided between said carriers near said picker and adapted to hold back the chaff and short straws brought up by said long carrier.

11. The combination, with a threshing-cylinder, of crushing-rolls located near the same, a long carrier having its discharge end near said rolls and whereon the straw to be separated and thinned is thrown from the load, a short carrier located above said long carrier and inclined with respect thereto and operating at a higher speed, the receiving end of said short carrier being near said long carrier but a sufficient distance therefrom to allow the chaff and short straws to pass between them, and means arranged near said long carrier to gather up the long straw thereon and deposit it upon said short carrier.

12. The combination, with a long slatted carrier whereon the straw is thrown, of a second comparatively short carrier located above said first-named carrier and operating at an inclination with respect thereto and at a higher speed, the receiving end of said short carrier being near said long carrier but a sufficient distance therefrom to allow the chaff and short straw to pass between them, means for gathering up the long straw upon said long carrier and depositing it upon said short carrier, and a retarding device provided between said carriers.

13. The combination, with a long carrier whereon the straw to be thinned is pitched or thrown, of a comparatively short carrier located above said first-named carrier and operating obliquely with respect thereto and at a higher speed, the receiving end of said short carrier being near said long carrier but a sufficient distance therefrom to allow the chaff and short straw to pass between them, and a picker arranged to gather up the straw from said long carrier and deposit it upon said short carrier, for the purpose specified.

14. The combination, with a carrier, of a second carrier operating above the same at a higher speed and arranged obliquely with respect thereto, means for gathering up the straw deposited upon said first-named carrier and delivering it to said second-named carrier, and a picker provided near the discharge end of said second-named carrier.

15. The combination, with the crushing-rolls, of a carrier whereon the straw to be thinned is thrown, a comparatively short carrier arranged above said first-named carrier and operating obliquely with respect thereto and at a higher speed, means for gathering up the straw upon said first-named carrier and depositing it upon said second-named carrier, and a picker provided near the discharge end of said second-named carrier.

In witness whereof I have hereunto set my hand this 12th day of December, 1901.

JOHN T. SMITH.

In presence of—
JENNIE SMITH,
CARL MEYER.